(12) United States Patent
Riley

(10) Patent No.: US 7,615,882 B2
(45) Date of Patent: Nov. 10, 2009

(54) UTILIZING AQUIFER PRESSURE TO GENERATE ELECTRICAL ENERGY

(76) Inventor: William Riley, 444 Madison Ave., 33rd Floor, New York, NY (US) 10022

( * ) Notice: Subject to any disclaimer, the term of this patent is extended or adjusted under 35 U.S.C. 154(b) by 49 days.

(21) Appl. No.: 12/036,789

(22) Filed: Feb. 25, 2008

(65) Prior Publication Data

US 2009/0212573 A1  Aug. 27, 2009

(51) Int. Cl.
 *F03B 13/00* (2006.01)
(52) U.S. Cl. .......................... 290/54; 290/43
(58) Field of Classification Search .................. 290/54, 290/43
 See application file for complete search history.

(56) References Cited

U.S. PATENT DOCUMENTS

| | | | | |
|---|---|---|---|---|
| 818,204 | A * | 4/1906 | Teilman | 290/4 D |
| 3,277,654 | A * | 10/1966 | Shiver | 405/55 |
| 3,538,340 | A * | 11/1970 | Lang | 290/52 |
| 3,729,054 | A * | 4/1973 | Yokoyama | 166/312 |
| 3,931,851 | A | 1/1976 | Harris et al. | |
| 4,248,305 | A * | 2/1981 | Scarbrough et al. | 166/305.1 |
| 4,261,419 | A * | 4/1981 | Probstein et al. | 166/52 |
| 4,282,444 | A * | 8/1981 | Ramer | 290/52 |
| 4,310,769 | A | 1/1982 | Mazzone et al. | |
| 4,448,237 | A | 5/1984 | Riley | |
| 4,607,169 | A * | 8/1986 | Donnelly, Jr. | 290/54 |
| 4,808,029 | A * | 2/1989 | Grupping | 405/59 |
| 5,103,914 | A * | 4/1992 | LaHaye | 166/310 |
| 5,685,362 | A | 11/1997 | Brown | |
| 6,396,162 | B1 | 5/2002 | Carrillo | |
| 7,084,521 | B1 | 8/2006 | Martin | |
| 2008/0253837 | A1 * | 10/2008 | Miller | 405/80 |

FOREIGN PATENT DOCUMENTS

| | | |
|---|---|---|
| JP | 2002-146852 | 5/2002 |
| JP | 2003172243 A * | 6/2003 |
| JP | 2008-014530 | 1/2008 |
| WO | WO 0196736 A1 * | 12/2001 |

OTHER PUBLICATIONS

International Search Report and Written Opinion of the International Searching Authority from corresponding PCT Application No. PCT/US2008/087918, dated Aug. 6, 2009.

* cited by examiner

*Primary Examiner*—Joseph Waks
(74) *Attorney, Agent, or Firm*—Fish & Richardson P.C.

(57) ABSTRACT

A system and method that utilizes aquifer pressure to generate electrical energy. The system includes an aquifer, a well fluidly coupled to the aquifer, a pump and a turbine. The pump is arranged to cause water to flow out of the well. In response to the water flowing out of the well, replenishing water flows naturally from the aquifer into the well. A turbine-generator is arranged to convert kinetic energy of the replenishing water flow into electrical energy.

20 Claims, 6 Drawing Sheets

UTILIZING AQUIFER PRESSURE TO GENERATE ELECTRICAL ENERGY

FIELD OF THE INVENTION

This disclosure relates to utilizing aquifer pressure to generate electrical energy.

BACKGROUND

In general, an aquifer is a naturally-occurring, underground layer (or layers) of water-bearing permeable rock or unconsolidated material (e.g., gravel, sand, silt or clay).

A water well is an artificial excavation used for the purposes of withdrawing water from an underground aquifer. Water may be drawn from a well using, for example, an electric or mechanical pump. Wells can vary greatly in depth, water volume and water quality.

In certain implementations, substantial amounts of water may be removed from a well for drinking, heating, cooling, irrigation and other uses.

SUMMARY OF THE INVENTION

In one aspect, a system is disclosed that includes an aquifer, a well fluidly coupled to the aquifer and a pump arranged to cause water to flow out of the well. The system is arranged so that, in response to the water flowing out of the well, replenishing water flows from the aquifer into the well. The system also includes a turbine-generator arranged to convert kinetic energy of the replenishing water flow into electrical energy.

In some implementations, the pump is located beneath the well's static fluid level. Typically, the pump is located downstream of the turbine-generator relative to the flow of replenishing water. The pump may be located inside the well or between the well and the aquifer. The turbine-generator's turbine may be located inside the well or between the well and the aquifer. Typically, the pump is at a higher elevation than the turbine.

In a typical embodiment, the replenishing water flows naturally from the aquifer into the well by virtue of a pressure differential that is created between the aquifer and the well when the water flows out of the well.

The pump may be adapted to cause water to flow out of the well at a substantially continuous rate or may be adapted to operate intermittently.

One or more components may be adapted to utilize the water that flows out of the well in connection with one or more domestic or industrial applications.

In another aspect, a method includes removing water from a well; replenishing the well, in response to the water being removed, with water from an aquifer that is fluidly coupled to the well; and converting kinetic energy of the replenishing water flowing from the aquifer to the well into electrical energy.

The replenishing water typically flows naturally by virtue of a pressure differential between the aquifer and the well. The pressure differential can occur as a result of the water leaving the well.

In some implementations, converting the kinetic energy includes directing the flow of replenishing water through a turbine-generator.

In certain embodiments, the water is removed from the well with a pump located beneath the well's static water level. The pump typically is located downstream of the turbine-generator relative to the direction of flow of replenishing water.

The water may be removed from the well at a substantially continuous rate or intermittently. The water thus removed may be utilized in connection with one or more domestic or industrial applications.

In yet another aspect, a system includes an aquifer, a well fluidly coupled to the aquifer and a pump arranged to cause water to flow out of the well. The system is arranged so that, in response to the water flowing out of the well, replenishing water flows from the aquifer into the well. The system also includes a turbine-generator arranged to convert kinetic energy of the replenishing water flow into electrical energy. One or more components are adapted to utilize the water that flows out of the well in connection with one or more domestic or industrial applications. The pump is located beneath the well's static fluid level and downstream of the turbine-generator relative to the flow of replenishing water. The replenishing water flows naturally from the aquifer to the well by virtue of a pressure differential created between the aquifer and the well when the water flows out of the well.

In some implementations, one or more of the following advantages may be present.

For example, significant amounts of electrical energy could be generated in an environmentally friendly manner. Additionally, the techniques disclosed herein could be implemented at a relatively low cost. Moreover, water may be drawn from a well in a highly efficient manner.

Other features and advantages will be apparent from the description and drawings, and from the claims.

DETAILED DESCRIPTION OF THE DRAWINGS

Figure 1:
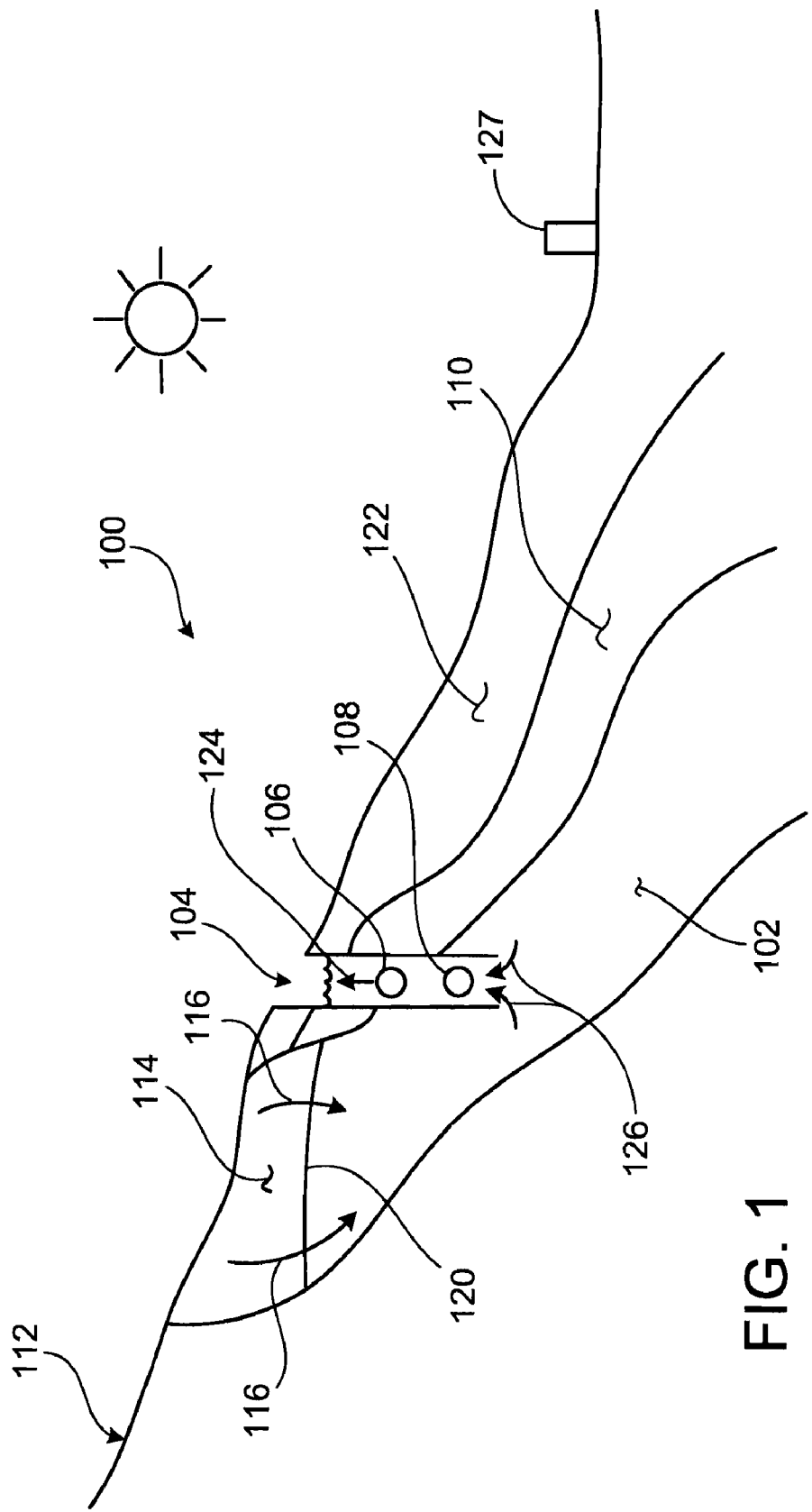
FIG. 1 is a cross-sectional elevation view of a system that utilizes aquifer pressure to generate electrical energy.

FIG. 1 is a cross-sectional elevation view of a system 100 that utilizes aquifer pressure to generate electrical energy. The illustrated system 100 includes an aquifer 102, a well 104, a pump 106 and a turbine-generator 108.

The illustrated aquifer 102 is a confined aquifer. A confining bed 110, therefore, bounds at least part of an upper side of the aquifer 102. The confining bed 110 has a generally lower hydraulic conductivity than the aquifer material in which the confined water is present.

A layer of relatively permeable material 114 is located directly above part of the aquifer 102. That layer of relatively permeable material 114 enables water to flow from the earth's surface 112 into the aquifer 102. This water flow is indicated by arrows 116. As illustrated, the aquifer 102 is filled with water approximately to the interface 120 between the aquifer 102 and the layer of relatively permeable material 114.

The well 104 is fluidly coupled to the aquifer 102. The well 104 extends from the earth's surface 112, through a layer of bedrock 122, through a portion of the aquifer's 102 confining bed 110 and into the aquifer 102 itself. The bottom of the well 104 is open to the aquifer 102 so that water may flow freely between the aquifer 102 and the well 104. The water level in the well 104 is approximately the same as the water level in the aquifer 102.

The pump 106 is located inside the well 104 and beneath the well's water level. The pump 106 is operable to cause water to flow out of the well 104 (the flow is indicated by arrow 124). The water that flows out of the well may be used, for example, in connection with any known domestic or industrial application involving water. For example, the water may be used for drinking, bathing, cleaning, cooling or heating applications in either domestic or industrial environments. In various implementations, the pump is adapted to operate substantially continuously. In other implementations, the pump is adapted to operate intermittently.

The aquifer 102 and the well 104 are arranged relative to one another so that if the pump 106 operates to remove water from the well 104, the aquifer 102 supplies replenishing water to the well 104. The flow of replenishing water from the aquifer 102 to the well 104 is indicated by arrows 126. The replenishing water flows naturally by virtue of a pressure differential that is created between the aquifer 102 and the well 104 when water flows out of the well 104. It is generally desirable, but not required, that the pump be operated in a manner that maintains a relatively constant flow of replenishing water from the aquifer 102 to the well 104. Typically, the volume of replenishing water that flows into the well 104 each time a given volume of water is removed from the well 104 is sufficient to maintain the respective water levels in the aquifer 102 and the well 104 equal to one another.

The turbine-generator 108 is located inside the well 104. It is beneath the well's water level and also is beneath (i.e., at a lower elevation than) the pump 106. The turbine-generator 108 is, therefore, upstream of the pump 106 relative to the direction of replenishing water flow (arrows 126). The turbine-generator 108 is arranged to convert kinetic energy of the replenishing water flow into electrical energy. The resulting electrical energy is supplied to an electrical power supply system (not shown in FIG. 1).

A well water utilization component 127 is outside the well 104. In general, that component is adapted to receive water from the well 104 and utilize the water in connection with one or more domestic or industrial applications. In various implementations, the component may be a drinking water fountain, a piece of industrial machinery that utilizes the well water for cooling or heating, a heating system for a home or any other component or combination of components that apply water to some useful purpose.

Figure 2:
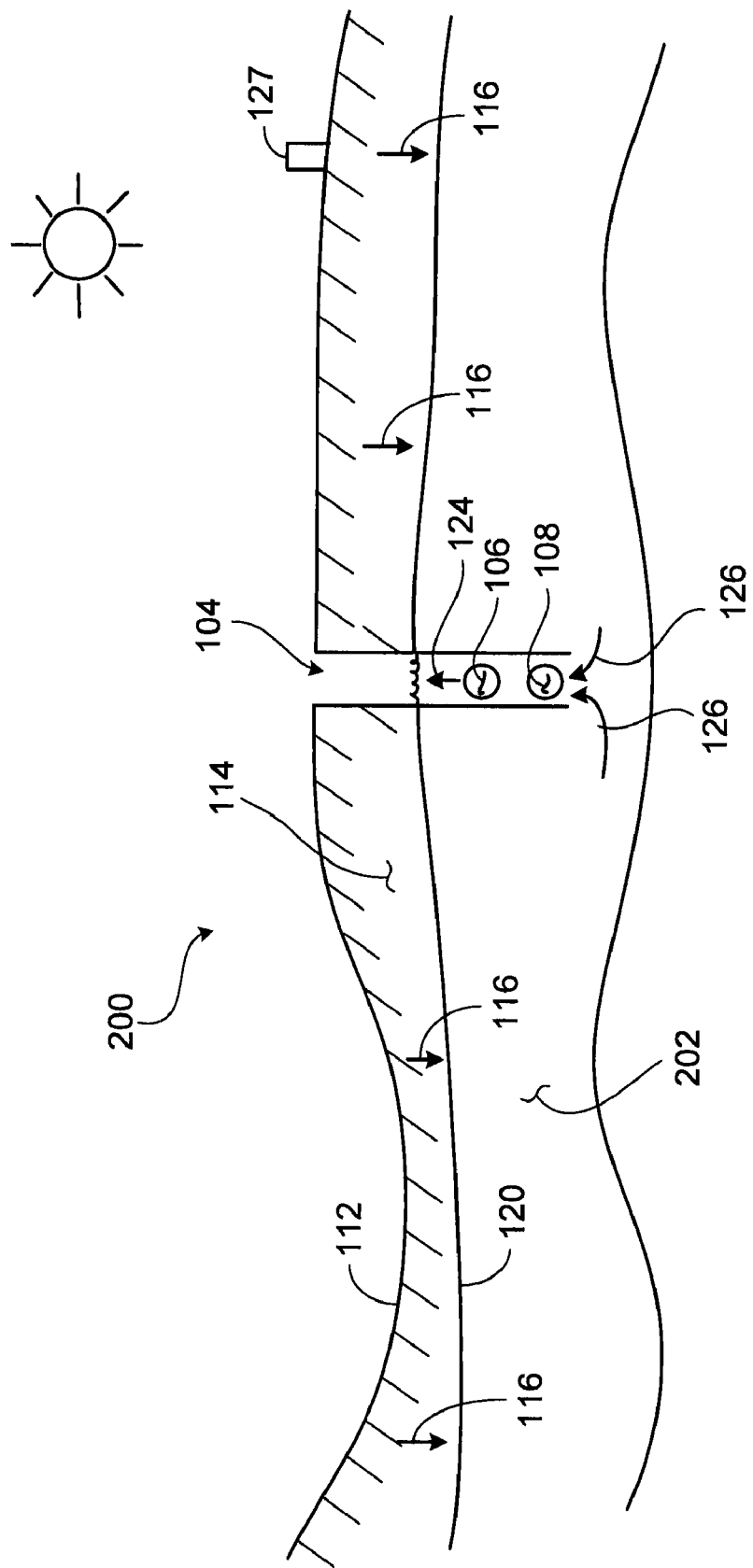
FIG. 2 is a cross-sectional elevation view of another system that utilizes aquifer pressure to generate electrical energy.

The system 200 of FIG. 2 is similar to the system 100 of FIG. 1 except that the aquifer 202 in FIG. 2 is an unconfined aquifer, not a confined aquifer. The unconfined aquifer 202 is not bound by a confining bed, such as confining bed 110 in FIG. 1.

In the illustrated system, a layer of relatively permeable material 114 is located directly above substantially the entire aquifer 102. The layer of relatively permeable material 114 enables water to flow from the earth's surface 112 into the aquifer 202. This water flow is indicated by arrows 116. In the illustrated system 200, the aquifer 202 is filled with water up to approximately the interface 120 between the aquifer 102 and the layer of relatively permeable material 114. The level of water in the well 104 is approximately equal to the level of water in the aquifer 202.

The pump 106 and the turbine-generator 108 are located inside the well 104 and beneath the well's water level. The pump 106 can be operated to cause water to flow out of the well 104 (flow is indicated by arrow 124). In response to such water removal, the aquifer 102 naturally supplies replenishing water to the well 104 (flow is indicated by arrows 126). The turbine-generator 108 converts kinetic energy of the replenishing water flow into electrical energy, which is supplied to an electrical power supply system (not shown in FIG. 2).

Figure 3:
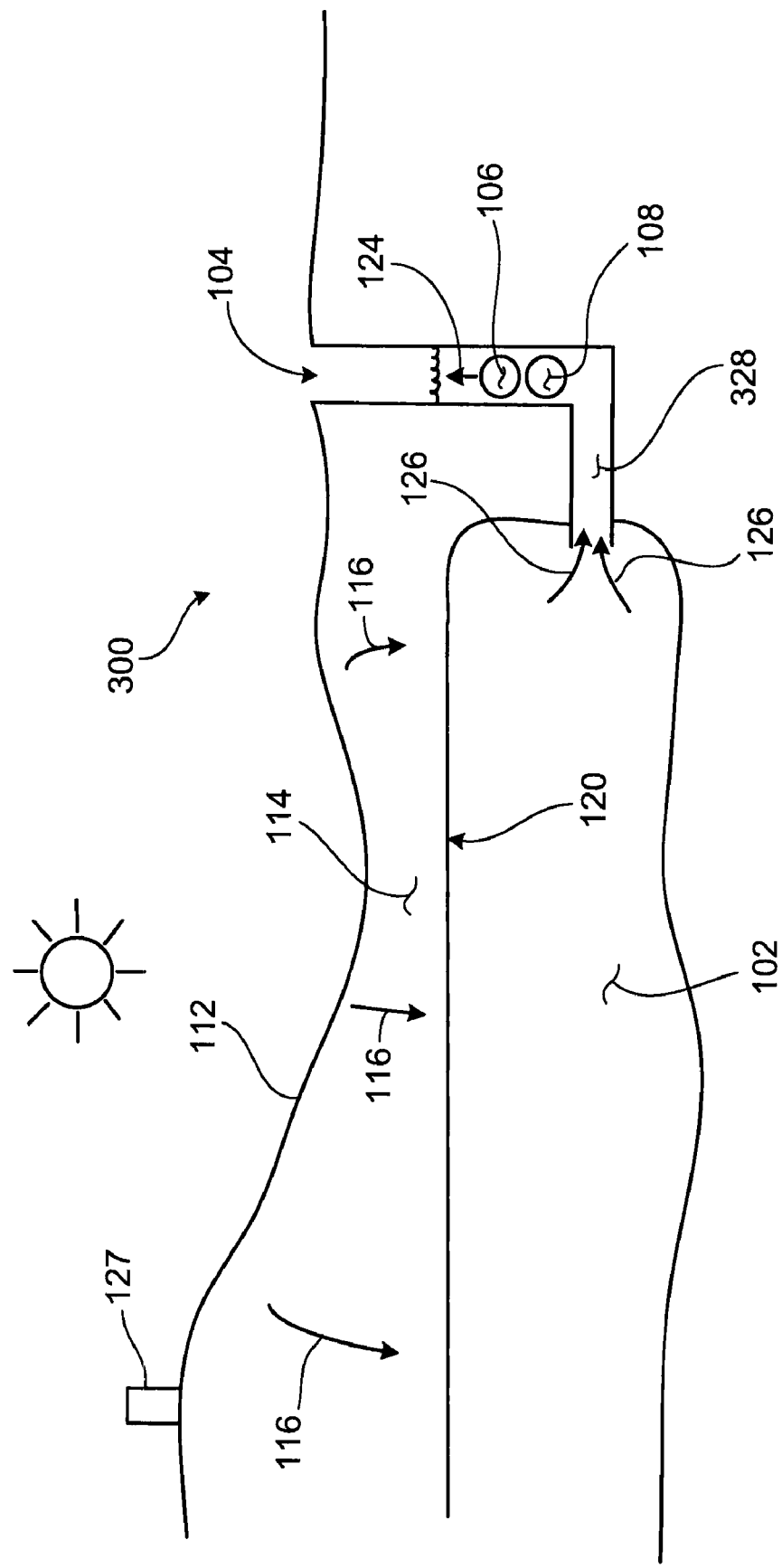
FIG. 3 is a cross-sectional elevation view of yet another system that utilizes aquifer pressure to generate electrical energy.

The system 300 of FIG. 3 is similar to the system 200 of FIG. 2 except that, in the system 300 of FIG. 3, the well 104 is horizontally offset from the aquifer 102. In the illustrated system 300, the well 104 and the aquifer 102 are fluidly coupled to one another via a horizontal borehole 328 that extends therebetween.

Both the pump 106 and the turbine-generator 108 are located inside the well 104. The pump 106 is arranged to cause water to flow out of the well (flow is indicated by arrow 124) and the turbine-generator is arranged to convert kinetic energy of replenishing water flow (flow is indicated by arrows 126) into electrical energy.

Figure 4:
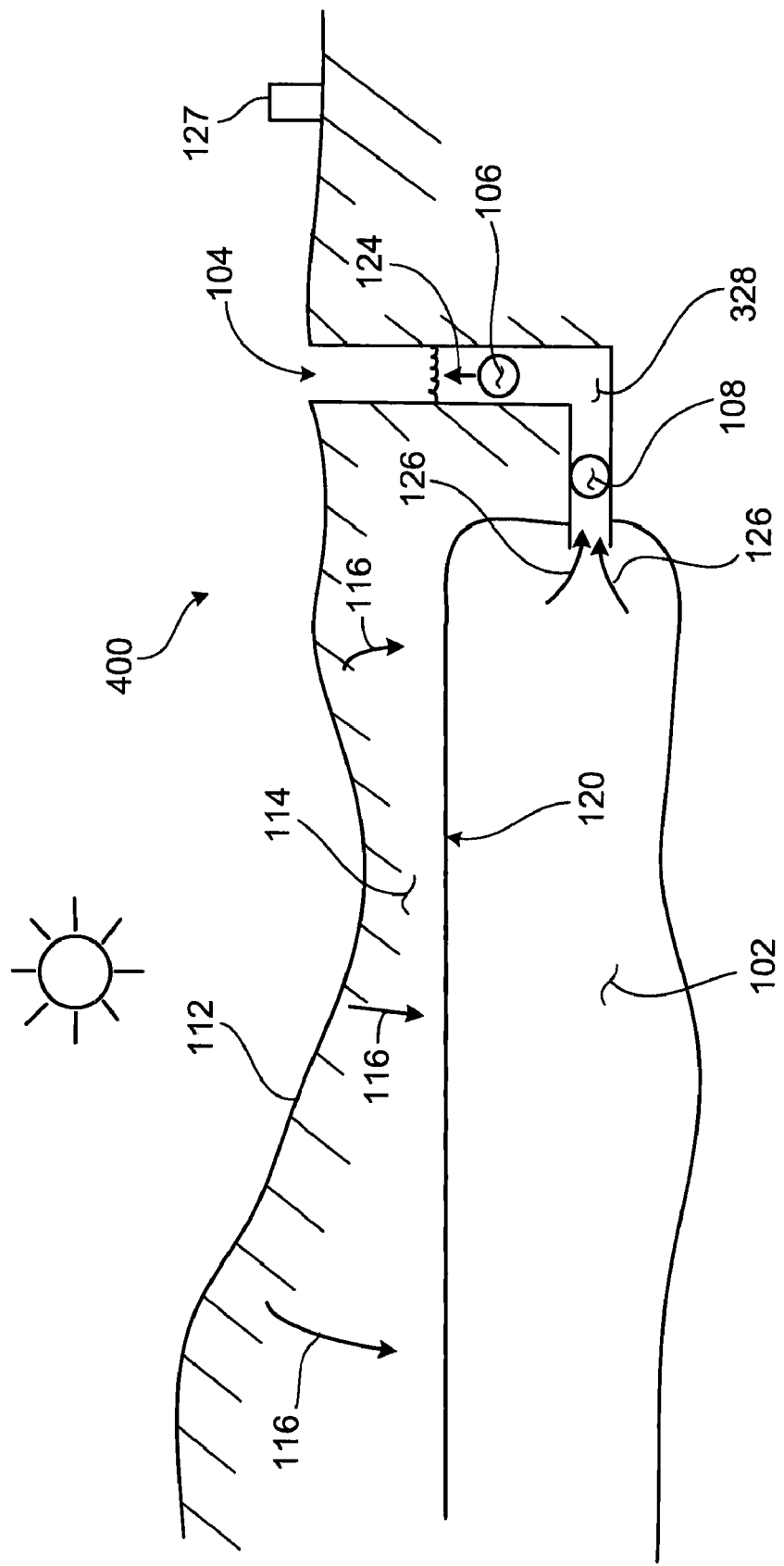
FIG. 4 is a cross-sectional elevation view of still another system that utilizes aquifer pressure to generate electrical energy.

The system 400 of FIG. 4 is similar to the system 300 of FIG. 3 except that, in the system 400 of FIG. 4, the turbine-generator 108 is located between the well 104 and the aquifer 102. More specifically, the turbine-generator 108 is located in the horizontal borehole 328 that extends between the well and the aquifer 102.

Figure 5:
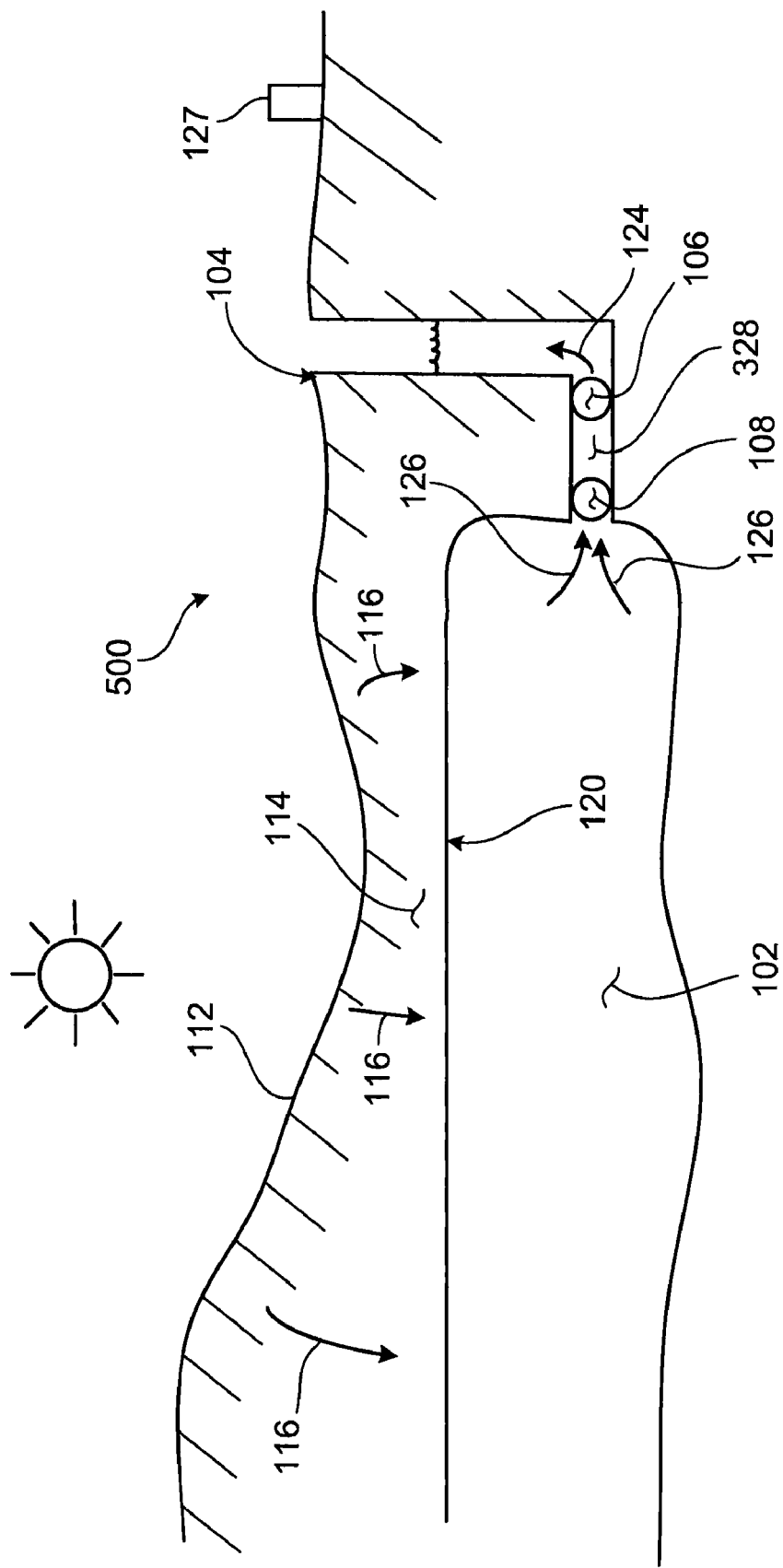
FIG. 5 is a cross-sectional elevation view of another system that utilizes aquifer pressure to generate electrical energy.

The system 500 of FIG. 5 is similar to the system 400 of FIG. 4 except that, in the system 500 of FIG. 5, both the pump 106 and the turbine-generator 108 are located between the well 104 and the aquifer 102. More specifically, the pump 106 and the turbine-generator 108 are located in the horizontal borehole 328 that extends between the well 104 and the aquifer 102.

Figure 6:
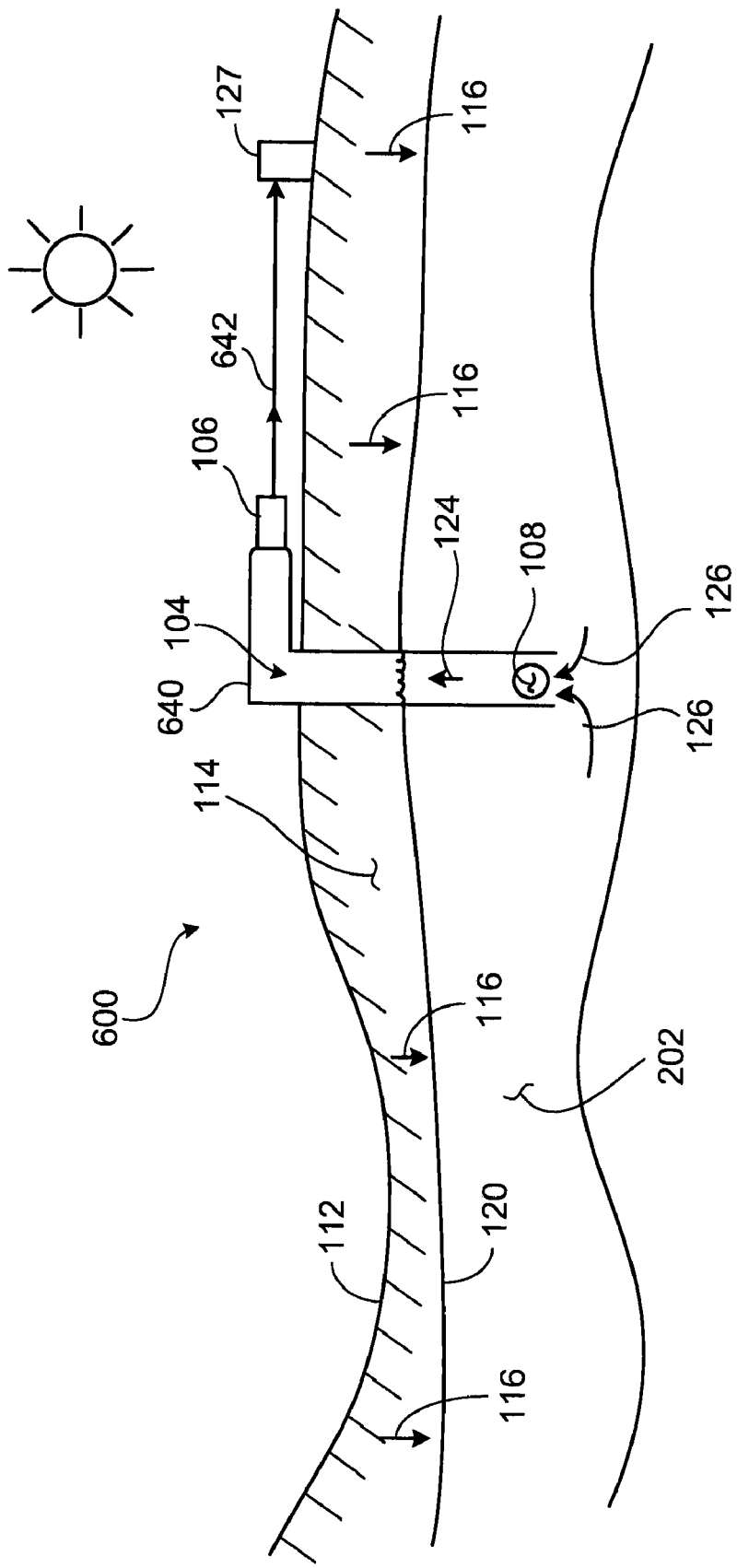
FIG. 6 is a cross-sectional elevation view of yet another system that utilizes aquifer pressure to generate electrical energy.

The system 600 of FIG. 6 is similar to the system 200 of FIG. 2 except that, in the system 600 of FIG. 6, the pump 106 is located outside of the well 104. A pipe 640 extends from the well to the pump 106. A second pipe 642 extends from the pump to the well water utilizing component 127. In implementations such as is illustrated, where the pump 106 is not beneath the water level in the well, the pump 106 is nevertheless capable of causing water to flow out of the well 104. The pump 106 may, for example, be a positive displacement type pump. Additionally, means may be provided to prime the pump 106, if desirable.

A number of embodiments of the invention have been described. Nevertheless, it will be understood that various modifications may be made without departing from the spirit and scope of the invention.

For example, the aquifer could comprise any type of subterranean collection of water that can be tapped to create a well. The aquifer could be bordered by any type of material, either permeable, semi-permeable or impermeable. The turbine-generator could be entirely submerged in well water. Alternatively, only the turbine-portion of the turbine-generator might be submerged, with the generator-portion of the turbine-generator fluidly isolated from the well water.

In certain instances, the well water (or at least a portion of the well water) may be returned to the aquifer and/or well after its use.

The pump may be a centrifugal pump or a positive displacement type pump. A variety of valve configurations may be implemented with a system.

Multiple wells and associated pump/turbine-generator sets may be associated with a single aquifer, with each well and associated pump/turbine-generator set being in fluid communication with a different part of the aquifer.

Accordingly, other implementations are within the scope of the claims.

What is claimed is:

1. A system comprising:
an aquifer;
a well fluidly coupled to the aquifer;
a pump arranged to cause water to flow out of the well, wherein the system is arranged so that, in response to said water flowing out of said well, replenishing water flows from the aquifer into the well; and
a turbine-generator arranged to convert kinetic energy of the replenishing water flow into electrical energy.

2. The system of claim 1 wherein the pump is located beneath the well's static fluid level.

3. The system of claim 2 wherein the pump is located downstream of the turbine-generator relative to the flow of replenishing water.

4. The system of claim 2 wherein the pump is at a higher elevation than the turbine.

5. The system of claim 1 wherein the pump is located inside the well.

6. The system of claim 5 wherein the turbine-generator's turbine is located inside the well.

7. The system of claim 5 wherein the turbine-generator's turbine is located between the well and the aquifer.

8. The system of claim 1 wherein the pump is located between the well and the aquifer.

9. The system of claim 1 wherein the replenishing water flows naturally from the aquifer into the well by virtue of a pressure differential that is created between aquifer and the well when the water flows out of the well.

10. The system of claim 1 wherein the pump is adapted to cause water to flow out of the well at a substantially continuous rate.

11. The system of claim 1 further comprising one or more components adapted to utilize the water that flows out of the well in connection with one or more domestic or industrial applications.

12. A method comprising:
removing water from a well;
replenishing the well, in response to the water being removed, with water from an aquifer that is fluidly coupled to the well; and
converting kinetic energy of the replenishing water flowing from the aquifer to the well into electrical energy.

13. The method of claim 12 wherein the replenishing water flows naturally by virtue of a pressure differential between the aquifer and the well.

14. The method of claim 13 wherein the pressure differential occurs as a result of the water being removed from the well.

15. The method of claim 12 wherein converting the kinetic energy comprises directing the flowing replenishing water through a turbine-generator.

16. The method of claim 15 wherein the water is removed from the well with a pump located beneath the well's static water level.

17. The method of claim 16 wherein the pump is located downstream of the turbine-generator relative to the flow of replenishing water.

18. The method of claim 12 wherein the water is removed from the well at a substantially continuous rate.

19. The method of claim 12 further comprising utilizing the water that is removed from the well in connection with one or more domestic or industrial applications.

20. A system comprising:
an aquifer;
a well fluidly coupled to the aquifer;
a pump arranged to cause water to flow out of the well, wherein the system is arranged so that, in response to said water flowing out of said well, replenishing water flows from the aquifer into the well;
a turbine-generator arranged to convert kinetic energy of the replenishing water flow into electrical energy; and
one or more components adapted to utilize the water that flows out of the well in connection with one or more domestic or industrial applications,
wherein the pump is located beneath the well's static fluid level and downstream of the turbine-generator relative to the flow of replenishing water, and
wherein the replenishing water flows naturally from the aquifer to the well by virtue of a pressure differential created between aquifer and the well when the water flows out of the well.

* * * * *